Sept. 13, 1966  J. H. BENT  3,272,079
FLUID PRESSURE OPERATED MOTOR
Filed Dec. 16, 1963  2 Sheets-Sheet 2

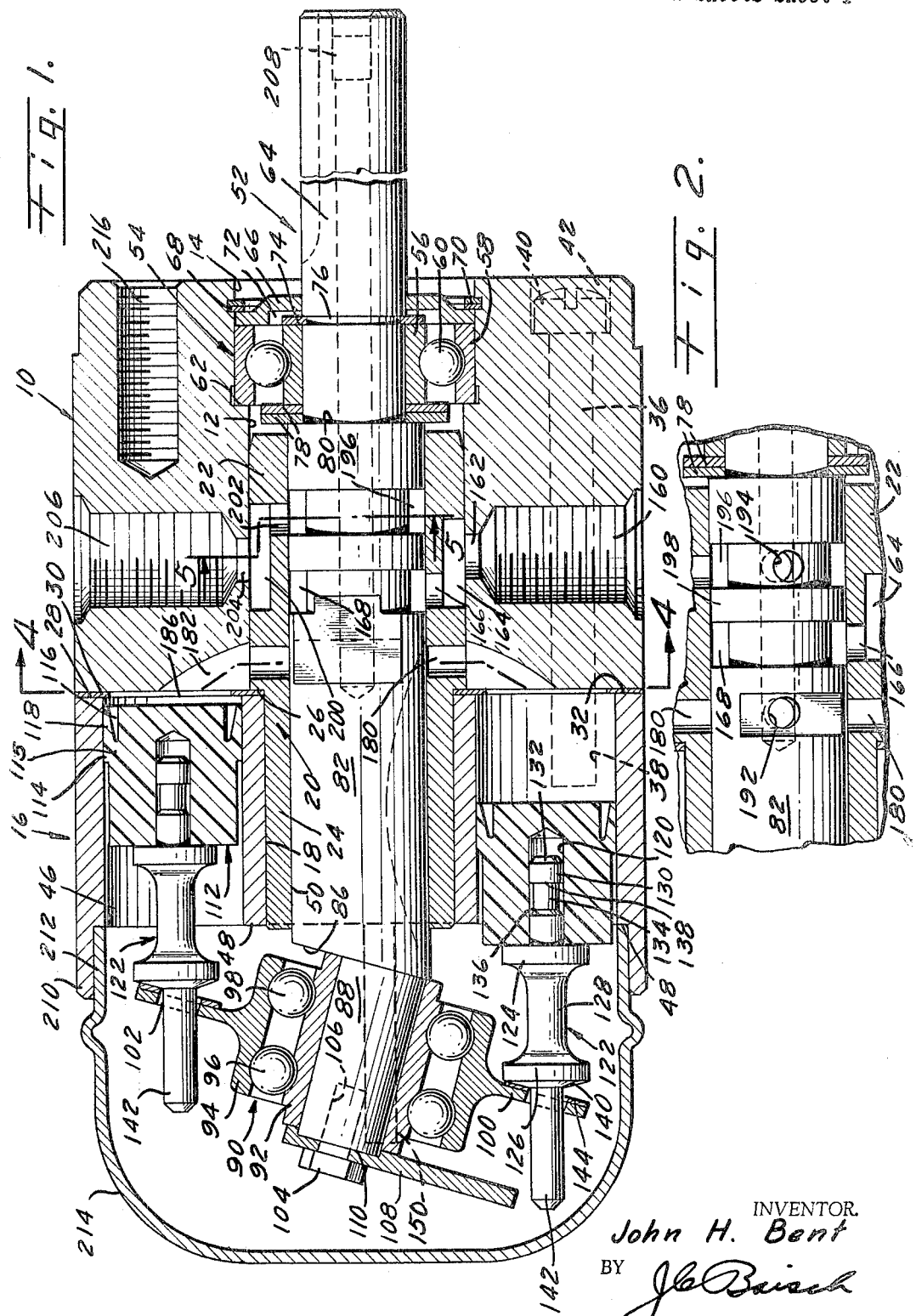

INVENTOR.
John H. Bent
BY
Attorney

United States Patent Office 3,272,079
Patented Sept. 13, 1966

3,272,079
FLUID PRESSURE OPERATED MOTOR
John H. Bent, Fullerton, Calif., assignor to Standard Pneumatic Motor Company, Whittier, Calif., a corporation of California
Filed Dec. 16, 1963, Ser. No. 330,845
12 Claims. (Cl. 91—175)

This invention relates generally to motors adapted to be actuated by pressure fluid for operating various types of power driven mechanism and relates more particularly to the wobble plate of air motors.

While the invention has particular utility embodied in a wobble plate type of air motor and is shown and described thus embodied, it is to be understood that its utility is not confined thereto.

One of the objects of the invention is to provide an air operated motor of this character that is powerful for its size.

Another object of the invention is to provide a motor of this character that is smooth in operation.

Still another object of the invention is to provide a motor of this character that is relatively quiet in operation.

A further object of the invention is to provide a motor of this character that has novel pistons for operating the wobble plate.

A still further object of the invention is to provide novel connecting means between the piston rods and the wobble plate.

Another object of the invention is to provide a motor of this character the operating parts of which are well balanced.

Still another object of the invention is to provide a motor of this character that is simple in construction.

A further object of the invention is to provide a motor of this character that has relatively few parts.

A still further object of the invention is to provide a motor of this character that is rugged in construction.

Another object of the invention is the provision of a motor of this character wherein friction is reduced to a minimum.

Still another object of the invention is the provision of a motor of this character that has a relatively long life.

A further object of the invention is to provide a motor of this character that may be easily and quickly serviced.

A still further object of the invention is the provision of a motor of this character which, should it be stalled, will not be damaged thereby and will start right up again when the stalling force is removed.

Another object of the invention is the provision of a motor of this character that is reliable in operation.

Still another object of the invention is the provision of a motor of this character that is relatively inexpensive to manufacture.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the use of any structures, arrangements, or modes of operation that are properly within the scope of the appended claims.

Referring more particularly to the drawings, which are for illustrative purposes only:

FIG. 1 is a longitudinal sectional view through a motor embodying the present invention;

FIG. 2 is a fragmentary view showing a side view of that portion of the drive shaft controlling air flow within the motor, said view being taken at a ninety degree angle relative to the position of the drive shaft as shown in FIG. 1;

Figure 3:
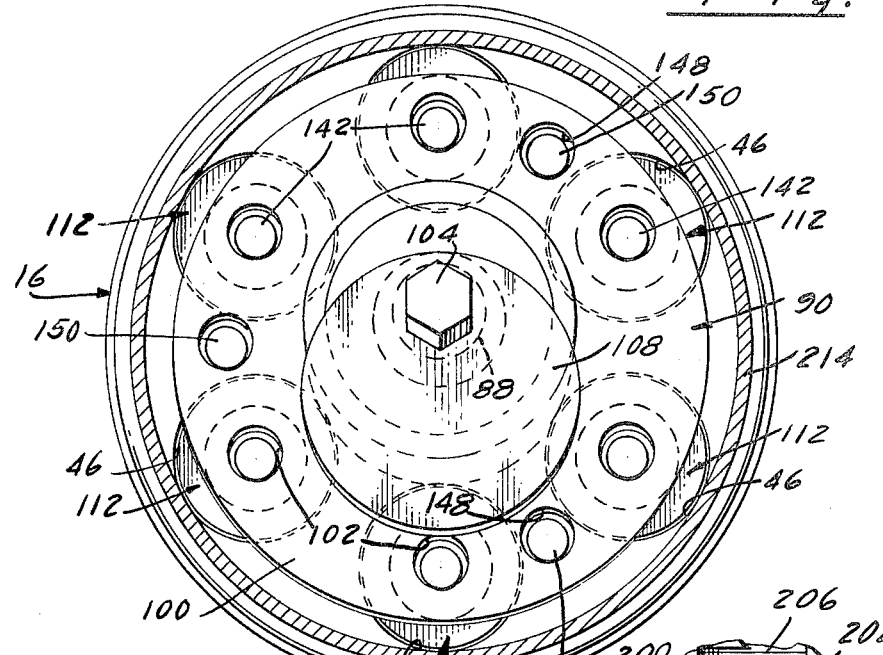
FIG. 3 is an end view of the mechanism with the cover removed.
Figure 5:
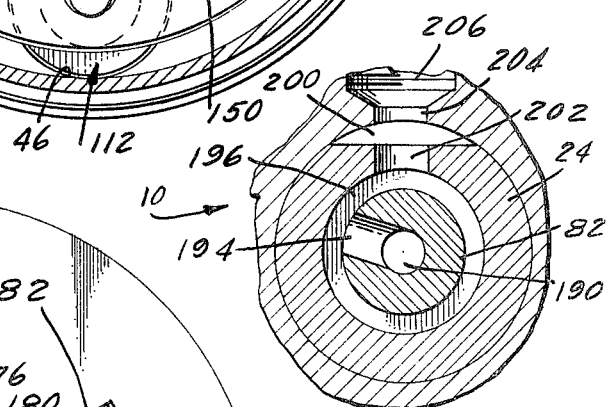
FIG. 5 is a sectional view taken on line 5—5 of FIG. 1.

Referring more particularly to FIG. 1, the motor comprises a body, indicated generally at 10, having a longitudinally extending bore 12 therethrough, there being a counterbore 14 at the outer end of greater diameter than the bore 12.

There is also a head, indicated generally at 16 having a longitudinally extending bore 18 therethrough in axial alignment with the bore 12 of the body 10, the bore 18 of the head being of smaller diameter than the bore 12 of the body.

Within the bores 12 and 18 is disposed a tubular bearing 20 having a forward part 22 of an external diameter such as to snugly fit within the bore 12. There is a rearward portion 24 of said bearing 20 that is of reduced external diameter for snug reception in the bore 18 of the head. At the junction of the portions 22 and 24 of the bearing 20 is a rearwardly facing shoulder 26 in the same plane as the rear end 28 of the body 10.

There is a gasket 30 having an axial opening therein of substantially the same diameter as the diameter of the bore 18 of the head and said gasket is disposed on the reduced diameter portion 24 of the bearing 20 for seating against said shoulder 26 and the surface 28 of the body. The adjacent end 32 of the head seats against the gasket 30 at the side opposite the body. Means for securing the body and head together with the gasket 30 therebetween comprise screws 36 received in longitudinally extending openings in the body provided therefor and in aligned tapped openings 38 in the forward end of the head. Screws 36 have heads 40 disposed in countersunk recesses 42 provided therefor in the forward end of the body.

Head 16 is provided with a plurality of longitudinally extending cylinders 46 spaced an equal distance from the axis of the bearing 20 and hence the axis of the bore 18. The axis of the head may also be considered as being coaxial with the axis of said bearing 20 and bore 18. The cylinders 46 are also spaced annularly apart equal distances. It is to be noted that the cylinders 46 extend through the head from the rear end 48 of the central portion of said head to the forward end 32.

Operably disposed within the axial bore of bearing 20, said axial bore being indicated at 50, there is a shaft, indicated generally at 52, which is rotatable in said bore 50.

Disposed within the enlarged diameter portion or recess 14 at the forward end of the body is a bearing 54. This bearing comprises a ball bearing assembly of well known type having inner and outer races 56 and 58 with balls 60 operably disposed therebetween. The inner end of the outer race 58 abuts against shoulder 62 at the inner end of the recess 14. A reduced diameter forward end portion 64 of the shaft 52 is operably disposed in the inner race 56, reduced diameter portion 64 extending forwardly of the front end of the body 10 a suitable distance, depending on the type of connection with a mechanism to be operated by the motor.

Proper positioning of the shaft 52 and retention against longitudinal displacement is provided by means including a cover 66 having a peripheral portion which engages the outer end of the outer race 58 and is held thereagainst by snap rings 68 received in recesses 70 provided therefor in the walls of the recess or counterbore 14 adjacent the forward end thereof. Thus the outer race of the bearing assembly 54 is clamped between the shoulder 62 at the inner end of the recess 14 and the peripheral edge portion of the cover 66. Cover 66 is provided with an interior recess 72 to accommodate a snap ring 74 operably disposed in an annular groove 76 in the reduced diameter shaft portion 64. Snap ring or retaining ring 74 is positioned against the forward end of the inner race 56, there being Belleville springs 78 disposed between the inner or rear end of the inner race 56 and shoulder 80 at the inner end of the reduced diameter portion 64, said shoulder 80 being at the forward end of the rear shaft portion 82 which extends rearwardly and projects just beyond the rear end of the bearing or bushing 20 which extends slightly rearwardly of the outer end of the portion 48 of the head 60.

At its rear end the portion 82 of the shaft 52 is inclined, as at 86, relative to a plane normal to the axis of said shaft 52. From the inclined end 86 of shaft 52 there extends a stub shaft or relatively short shaft 88 having an axis perpendicular to the plane of the end 86, the axis of stub shaft 88 being offset toward the higher side of the end 86.

Stub shaft 88 is of smaller external diameter than the external diameter of shaft portion 82 and said stub shaft 88 has operably disposed thereon a wobble plate assembly, indicated generally at 90, which includes an inner race 92 having a bore therethrough for reception of said stub shaft 88. Wobble plate assembly 90 includes an outer race 94 and two sets of balls are operably disposed between the inner and outer races. The balls 96 of one set are positioned adjacent the outer or rear ends of the inner and outer races 92 and 94 and the balls 98 of the other set are positioned adjacent the forward or inner ends of said races 92 and 94. Thus the sets of balls are in parallel planes spaced apart longitudinally or axially relative to the axis of the ball bearing portion of the wobble plate assembly and this arrangement prevents tilting or misalignment of the races relative to each other. Extending annularly about the outer race 94 and intermediate the ends thereof is an annular flange 100. Flange 100 may be considered the wobble plate and is in a plane midway between the planes of the sets of balls. There are a plurality of openings 102 through the wobble plate adjacent the periphery thereof, said openings having their axes parallel to the axis of the stub shaft 88, there being the same number of openings as there are cylinders 46.

Wobble plate assembly 90 is secured on the stub shaft 88 by a screw 104 screwed into a tapped opening 106 extending axially inwardly of the rear or free end of said stub shaft 88.

In order to balance the mechanism there is a counterbalance element or plate 103 having a recess 110 adjacent one end in which an outer free end portion of the stub shaft 88 is received, so that the area about the recess 110 engages the adjacent or rear end of the inner race 92 of the bearing assembly of the wobble plate. Thus the wobble plate assembly is securely held on the stub shaft 88 with the inner race clamped between the end portion 86 of the shaft portion 82 and the counterbalance or member 108. Member 108 extends from the attached end in the direction of the higher or rearmost portion of the flange or wobble plate 100, as shown in FIG. 1, said plate or member 118 in a plane parallel to the plane of wobble plate 100.

Means for effecting wobbling movement of the wobble plate, and hence rotation of the drive shaft 52 of the motor, comprises a plurality of pistons indicated generally at 112 for respective cylinders 46. Pistons 112 are all of the same construction and hence a description of one will suffice. Each piston has a cylindrical portion 114 that operably engages the inner surface of the respective cylinder 46, said portion 114 being at the inner or forward end of the piston. At the forward end of the piston there is an annular groove 116 which is adjacent the periphery of the portion of the piston at the forward end thereof which engages the cylindrical wall of the cylinder. At the outer side of groove 116, which extends rearwardly of the piston from its forward end, there is a skirt 118. Pistons 112 may be made of any suitable material, such as a resilient plastic or the like. One such plastic that has been found very satisfactory is Du Pont's "Teflon," which is the registered trademark for their fluorocarbon resins, including the TFE (tetrafluorethylene) resins. This material is somewhat resilient and pressure fluid in the groove 116 exerts an outward pressure on the flange or skirt 118 to thereby urge same against the cylinder wall to provide a highly effective seal between the piston and said cylinder wall. At the rear of the cylindrical part 114 of the piston there is an annular area 115 between the inner end of groove 116 and the periphery of said rear end of part 114 that will flex to permit some tilting of the piston rod, hereinafter described, to main a free operative connection with the wobble plate.

Each piston has an axial bore 120 extending forwardly from the rear end thereof but closed at the forward end. The piston rod, indicated generally at 122, has a pair of flanges 124 and 126 spaced longitudinally apart and connected together by a central piston rod portion 128 of substantially smaller diameter than said flanges. Projecting forwardly of flange 124 is a forward end portion 130 arranged axially relative to the flanges 124 and 126 and part 128 which is received in the bore 120 to thereby secure the piston rod and the piston together. At its forward end the portion 130 of the piston rod is inwardly tapered, as at 132, to facilitate insertion of the forward end portion 30 in said bore 120. If desired the forward end portion 30 may also be provided with a reduced dimeter portion 134 intermediate the ends thereof. The forwardly facing shoulder 136 at the rear of the reduced diameter portion 134 is forwardly and inwardly tapered while the rearwardly facing shoulder 138 at the forward end of the reduced diameter portion 134 is normal to the axis of the forwardly extending portion 130 so that there will be some resistance to removal of the portion 130 from the bore 120. The rearwardly facing side of the flange 126 is frusto conical in shape, as indicated at 140, with the sides having an angularity corresponding to the angularity of the wobble plate. From the smaller rear end of the frusto conical part 140 there extends rearwardly a rear end portion 142 of the piston rod, said rear end portion 142 being operably disposed in a respective opening 102 in the wobble plate. These holes 102 are of substantially greater diameter than the diameter of the piston rod portions 142 to prevent binding of said piston rod portions 142 in their respective holes 102 when respective wobble plate portions at respective holes are at forward and rear limits of movement.

A washer 144 of suitable material is disposed between the frusto conical portion 140 and the adjacent side of the wobble plate 100. Washer 144 may be of any suitable material that is relatively hard and wear-resisting. The contact between the tapered or inclined surface of the frusto conical part 140 and the washer is a line contact and extends radially relative to the washer and said frusto conical part 140, thus providing a relatively extensive contact between these parts. It is to be noted that the washer 144 may be of a hard fibrous material of well known character or it may be of a suitable plastic or metal.

In order to prevent the wobble plate from rotating there are a plurality of guide openings 148 in said wobble plate adjacent the periphery thereof, said openings 148 being disposed between certain of said openings 102. The openings 148 are annularly spaced apart from each other equal distances, there being three such openings provided in the wobble plate. These openings 148 slidably receive respective guide pins 150 which are secured in bores provided therefor in the rear end of the head 16. These pins are press fitted into said bores or otherwise secured therein and extend rearwardly of the wobble plate a sufficient distance to prevent disengagement from the respective openings 148.

Any part of the wobble plate moves longitudinally relative to the axis of the shaft 52 between a forward position adjacent the end 48 of the head 16 and a rearward position spaced further rearwardly of the end 48 of head 16 than the first mentioned position. The first mentioned position will be termed the forward or lower position and the second position will be termed the rearward or the upper position.

Pistons 112 exert rearward pressure on a respective part of the wobble plate when such part is at the forward or lower position and the rearward pressure of the piston, transmitted through the connecting rod thereof forces the respective part of the wobble plate rearwardly and simultaneously causing the diametrically opposite piston to be moved forwardly in its cylinder. The various pistons act on the wobble plate in succession and cause the stub shaft 88 to act as a crank to thereby effect rotation of the shaft 52.

Pressure fluid is supplied to an exhausted from the cylinders 66 in a cyclic manner to effect the proper application of power to the wobble plate. Control of the pressure fluid is provided by valve means forming part of the part 82 of shaft 52.

At one side of the body 10 there is a tapped bore 160 which extends radially inwardly from the outer surface of said body and has a reduced diameter connecting passage 162 connecting the inner end of said bore 160 with a recess 164 in the portion 22 of bearing 20. Tapped bore 160 is for threadable reception of a suitable fixture, not shown, of a fluid pressure conduit connected with a source of fluid pressure, not shown. At the rear end of recess 164 there is a passage 166 which connects said recess 164 with the bore 50 of the bearing or bushing 20. At this location the part 82 of the shaft 52 is provided with an annular recess or groove 168 which communicates rearwardly with a relieved section or recess 170 of said shaft portion 82. Recess 170 is of limited circumferential extent and at the opposite side of said shaft portion 82 there is a similar recess, indicated at 172. The part of the shaft portion 82 between the recesses 170 and 172 is generally wedge-shape with an end 174 of substantially greater circumferential extent than the opposite end 176.

Figure 4:
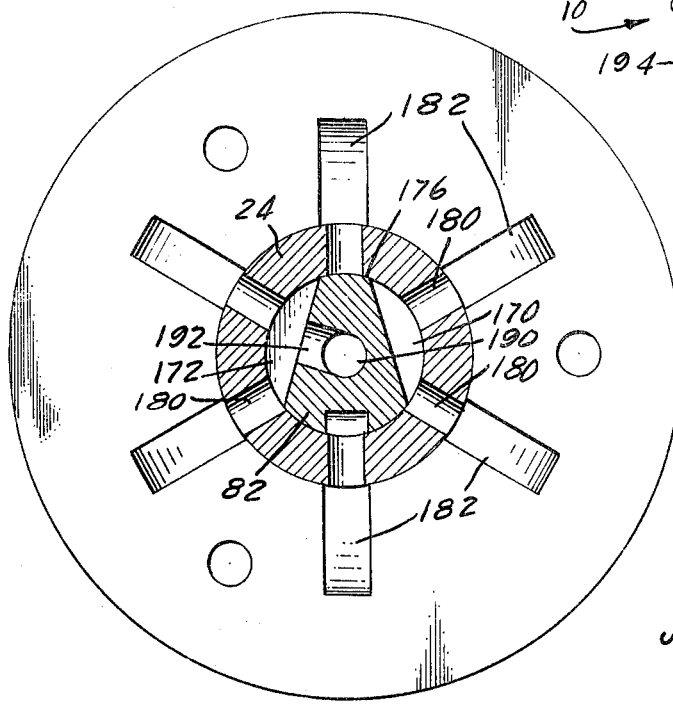
FIG. 4 is a sectional view taken on line 4—4 of FIG. 1.

Bushing portion 82 is provided with a plurality of radially extending bores 180 which connect the bore 50 of bushing or bearing 20 with respective slots 182 which extend radially outwardly and rearwardly at the rear of the body 10. Each of the slots 182 have their outer ends connected with respective cylinders 46 through openings 186 provided therefor in the gasket 30. Thus operating pressure fluid flows from the tapped opening 160, through the passage 162, into the groove 164, and thence into the recess 170 for distribution to the respective cylinders in the proper sequence, through the passages 180, slots 182, and openings 186 in the gasket 30. As the shaft 52 rotates the recess 170 is brought into register with the passages 180 and then moves out of register with said passages. It is to be noted that there is one passage 180 that is in full communication with said recess 170 while the passage 180 at one side thereof is being closed and the passage 180 at the opposite side is being opened. In FIG. 4 only two of said passages 180 are in register with the recess 170 but the passage at the opposite side may be in partial register with said recess while the passage at the first mentioned side is also in register with said recess.

At the same time oppositely arranged passages communicate with the recess 172 for exhaust of fluid pressure that has been utilized in actuating certain selected pistons. Here, again, there is one passage 180 that is in full register and communication with the recess 172, while the passage 180 at one side thereof is partly closed, the passage at the opposite side being fully closed. The partly closed passage communicating with the recess 172 is diametrically opposite the passage 180 that is fully open and in communication with the recess 170. Passage 180 that is in full register with the recess 172 is diametrically opposite the passage 180 communicating partially with the recess 170. The other two passages 180 are shown as being out of register with the recesses 170 and 172.

Recess 172 is connected with a bore 190 extending longitudinally in the shaft 52 by means of a cross-bore 192. Spaced forwardly of the cross-bore 192 is a second cross-bore, indicated generally at 194, which connects said longitudinal bore 190 with an annular groove 196 in the shaft portion 64, there being an annular wall 198 between the recess 196 and the recess 168 to thereby form a partition which prevents fluid communication directly between said recesses 196 and 168.

Opposite the recess 164 in the outer side of the bushing portion 22 is a recess 200 connected with the groove 196 by a radially extending passage 202. Recess 200 in the bushing is connected by a short passage 204 with an enlarged tapped bore 206 which extends radially from the outer side of the motor body and has a thinner end connected with said passage 204. Thus spent pressure fluid may flow from cylinders whose pistons have reached their rearmost position and begin to move forwardly through the openings 196, slots 182 and recess 172, and thence through the cross-bore 192, longitudinal bore 190, cross-bore 194, recess 196, bore passage 202, recess 200, passage 204 and tapped bore 206. The pressure fluid exhausted from tapped bore 206 goes to atmosphere.

In order to insure full relief of pressure from the cylinders when the pistons have reached the end of their power strokes and are ready to return to the inner end of said cylinders, a groove 207 is provided in the rear portion of shaft portion 82, said groove 207 having its inner end located for successive registration with the respective slots 182 as the shaft rotates. The outer end of said groove 207 extends beyond the rear end of the bushing 20 for discharge of air into a chamber 213 defined by a cover or cap 214 which protects the mechanism at the rear of the motor from the entrance of dust, dirt, and/or other foreign material, and also protects this part of the mechanism from blows or the like that might damage said mechanism. Holes 215 in the cover allow air exhausted from the cylinders through the groove 207 in the chamber 213 to exhaust to atmosphere.

Cap or cover 214 has a forward end portion 212 removably disposed and frictionally held within a longitudinally extending flange 210 at the rear of head 216.

The rear end of groove 207 is disposed in the portion 174 of the the wedge-shaped part of the shaft separating the recesses 170 and 172 and provides release of pressure within the respective cylinders with which said groove 207 is connected when the pistons thereof have reached the end of their power strokes and prior to the connection thereof with one of the recesses 170 and 172 depending upon the direction of rotation of the shaft which connects the cylinders to be exhausted with atmosphere throughout the entire exhaust strokes of said pistons. Thus complete and full exhaustion from said cylinders of spent or used pressure fluid is effected.

The description of the flow of pressure fluid to the cylinders from the tapped bore 160 and the exhausting of spent pressure fluid from said cylinders to the tapped bore 206 and thence to atmosphere occurs when the motor shaft is being operated in one direction. Reverse rotation of the motor may be effected by introducing pressure fluid into the tapped bore 206 and exhausting the spend pressure fluid from the tapped bore 160.

It will be apparent from FIGS. 1, 2, 4 and 5 that the supply of pressure fluid to the various cylinders is controlled by valving means which includes the various recesses, grooves and bores of the motor shaft and the partitions separating said recesses in said shaft. Further, the pressure fluid is provided to the cylinders successively as the shaft rotates and the spent fluid is correspondingly exhausted from said cylinders.

As described above, several cylinders are provided with pressure fluid at the same time and several of the other cylinders are connected to atmosphere at the same time. This arrangement insures that several pistons are applying power to the wobble plate at the same time to effect wobbling movement thereof and rotation of the motor shaft, so that power is applied to said wobble plate smoothly and evenly.

It is to be noted that the longitudinally extending bore 190 and the shaft 52 has a plug 202 outwardly of the cross-bore 194 to prevent escape of air at the forward or outer end of said motor shaft 52.

Means may also be provided for attachment of the motor to a support, said means comprising a tapped bore 216 which extends rearwardly from the forward end of the body and adjacent the periphery thereof.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific forms shown or uses mentioned except as defined in the accompanying claims, wherein various portions have been separated for clarity of reading and not for emphasis.

I claim:

1. A pneumatic motor, comprising:
   (A) a body having an axial bore therethrough, a pair of diametrically opposed tapped bores in said body communicating with the axial bore thereof, and a plurality of radially arranged slots at the rear of the extending from the axial bore thereof;
   (B) a head secured to the rear end of the body, said head having an axial bore therethrough aligned with the axial bore of the body, and a plurality of annularly arranged and spaced cylinders extending longitudinally through the head and spaced equal distances from the axis of the head;
   (C) a sealing gasket between the adjacent ends of the body and head, said gaskets having openings therethrough in register with the forward ends of the respective cylinders;
   (D) a bushing operably secured in a rear portion of the axial bore in the body and in the axial bore of the head, said bushing having an axial bore therethrough coaxial with the bores of the body and head, a plurality of radial passages connecting the interior of the bushing bore with the respective slots at the end of the body, and a pair of external recesses at diametrically opposite sides thereof, one of said recesses having its rearward end connected with the axial bore of the bushing and the other of said recesses having its forward end connected with the axial bore of said bushing, the tapped bores in the body being connected with the respective recesses;
   (E) a motor shaft operably disposed within the axial bore of the bushing and having a part extending forwardly of the forward end of the body, said shaft having a longitudinally extending bore therein closed at both ends, a first annular groove communicating with the recess having its forward end connected with the bore of the bushing, said shaft having a second annular groove communicating with the recess having its rear end connected with the bore of said bushing said second annular groove being spaced rearwardly of the first annular groove and separated therefrom by an annular flange forming part of the shaft, said shaft having relieved portions at diametrically opposite sides with a generally wedge-shaped part of the shaft therebetween, said recesses being adapted to be connected with the radial passages of the bushing to successively supply fluid to said cylinders with rotation of the motor shaft, there being pressure fluid supplied to a plurality of cylinders at a time, the other of said recesses being adapted to be connected with cylinders for exhaust fluid, said shaft having a cross-bore connecting the second recess with the longitudinally extending bore of the shaft, whereby exhaust fluid is carried through said longitudinally extending shaft bore, into the recess connected with said longitudinal bore through the first mentioned cross-bore in the shaft, the rear end of said shaft extending rearwardly of the rear end of said bushing and being bevelled at inclination relative to a plane normal to the axis of the shaft, said bevelled end having a part spaced rearwardly of the diametrically opposite part, said shaft having a stub shaft integral with the rear end thereof and having an axis perpendicular to the rear bevelled end of said shaft, the axis of the stub shaft being offset from the axis of said motor shaft;
   (F) a wobble plate assembly on said stub shaft, said wobble plate assembly including a ball bearing assembly having an inner race with an axial bore therethrough receiving the stub shaft, an outer race, and two sets of ball bearings operably positioned between the inner and outer races, said sets of ball bearings being in respective planes parallel to each other and spaced apart axially relative to said bearing assembly, and an annular flange integral with and extending about the outer race in a plane midway between the plane of the respective sets of balls, said flange comprising a wobble plate having a plurality of holes therethrough adjacent the periphery thereof, said holes being spaced equal distances from the axis of the stub shaft and being annularly spaced apart equal distances, and other holes between certain of the first mentioned holes in the wobble plate;
   (G) means securing the wobble plate assembly on the stub shaft, said means including a counterbalancing weight having one end secured to the free end of said stub shaft and extending parallel to the wobble plate at one side of said stub shaft;
   (H) a piston reciprocable in each of said cylinders, each piston being of a resilient plastic material having a cylindrical inner end portion engaging the walls of its cylinder and an annular groove extending from the inner end of the piston toward the outer end to thereby provide a relatively thin skirt which forms part of the cylindrical portion of the piston engaging the cylinder walls, each piston also having an axial bore extending from the rear end forwardly thereof but closed at the forward end;
   (I) a piston rod having a portion disposed within the axial bore of the piston, a flange engaging the outer end of the piston, and an annular flange on said piston rod spaced rearwardly of the piston and having a frusto conical rear side, said piston rod having a rear end portion extending rearwardly from the smaller part of the frusto conical side and extending through one of the first mentioned holes in the wobble plate, said holes sufficiently larger than the portion of the piston rod extending therethrough to permit operable movements of said wobble plate;
   (J) and a washer on the rearward end portion of the piston rod disposed between the frusto conical side of the flange on the piston rod and the adjacent side of the wobble plate, said washer serving as a bearing.

2. In a pneumatic motor:
   (A) a main shaft having one end bevelled and a stub shaft on said bevelled end normal to the bevelled surface of said end of said main shaft, the axis of said stub shaft where it joins said surface being offset from the axis of said main shaft;

(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft said wobble plate having a plurality of annularly arranged openings therein for operable reception of said portions of respective piston rods, the frusto conical part of the piston rods exerting line contact pressure relative to the wobble plate;
(G) means preventing rotation of said wobble plate;
(H) and means for operably controlling pressure fluid to and from said pistons.

3. In a pneumatic motor:
(A) a main shaft having one end bevelled and a stub shaft on said bevelled end normal to said surface, the axis of said stub shaft being offset from the axis of said main shaft;
(B) means rotatably mounting said main motor shaft;
(C) a plurality of cylinders extending longitudinally relative to the axis of the main shaft and arranged about said axis, said cylinders being equally spaced from the axis of the main shaft and being annularly spaced apart equal distances relative to each other;
(D) a piston in each cylinder, each piston having a skirt at the inner end, the periphery of the skirt being cylindrical and engageable with the wall of its cylinder;
(E) a piston rod secured to each piston and extending outwardy of the outer end thereof, each of said piston rods having an annular flange thereon spaced from the piston and having a frusto conical side opposite the piston, there being a free end portion of said rod extending axially from the smaller end of said frusto conical side;
(F) a wobble plate operably mounted on the stub shaft, said wobble plate having a plurality of holes therethrough adjacent the periphery thereof for operable reception of said free end portions of respective piston rods, said holes being substantially larger than the diameter of said free end portions of the piston rods, the frusto conical side of the pitson rod flanges exerting line contact pressure relative to the wobble plate;
(G) means preventing rotation of said wobble plate;
(H) and means for operably applying pressure fluid to said pistons for applying actuating pressure to said wobble plate and for successively relieving operating pressure on pistons which have completed their power strokes.

4. In a pneumatic motor;
(A) a main shaft having one end bevelled and a stub shaft on said bevelled end perpendicular to the bevelled surface of the bevelled end of said main shaft, the axis of said stub shaft at the junction of said stub shaft and bevelled surface being offset from the axis of said main shaft;
(B) means rotatably mounting said main motor shaft;
(C) a plurality of longitudinally extending parallel cylinders arranged annularly about said main shaft, said cylinders being equally spaced from the axis of the main shaft and being annularly spaced apart relative to each other;
(D) a piston of resilient material in each cylinder, each piston having a skirt adjacent the inner end, the periphery of the skirt being cylindrical and engageable with the wall of its cylinder;
(E) a piston rod secured to each piston and extending outwardly of the outer end thereof, said pistons having sufficient flexibility to permit some tilting of the piston rods, each of said piston rods having a part with a frusto conical side facing away from the piston, there being a free end portion of said rod extending axially from the smaller part of said frusto conical side;
(F) a wobble plate assembly operably mounted on the stub shaft, said wobble plate assembly including an inner bearing race secured on said stub shaft, an outer bearing race and friction reducing means between said inner and outer races holding same in axial alignment with each other and permitting rotation of the outer race relative to the inner race, and an annular flange on the outer race in a plane normal to the axis of the stub shaft, said flange comprising a wobble plate having a plurality of holes therethrough for reception of the free end portions of respective piston rods, the frusto conical sides of the piston rod flanges exerting line contact pressure relative to the wobble plate;
(G) means preventing rotation of said wobble plate;
(H) and means for controlling fluid operating pressure to and from said pistons.

5. In a pneumatic motor:
(A) a main shaft having one end bevelled and a stub shaft on said bevelled end normal to the bevelled surface of said end of said main shaft, the axis of said stub where it joins said surface being offset from the axis of said main shaft;
(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft, said wobble plate having a plurality of annularly arranged openings therein for operable reception of said portions of respective piston rods;
(G) members interposed between the wobble plate and respective frusto conical parts of the piston rods whereby said frusto conical parts have line contact with said members.
(H) means preventing rotation of said wobble plate;
(I) and means for operably controlling pressure fluid to and from said cylinders.

6. In a pneumatic motor:
(A) a main shaft having one end bevelled and a stub shaft on said bevelled end normal to the bevelled surface of said end of said main shaft, the axis of said stub where it joins said surface being offset from the axis of said main shaft;
(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft, said wobble plate having a plurality of annularly arranged openings therein for operable reception of said portions of respective piston rods;
(G) members interposed between the wobble plate and respective frusto conical parts of the piston rods whereby said frusto conical parts have line contact with said members;
(H) and means preventing rotation of said wobble plate.

7. In a pneumatic motor:
(A) a main shaft having one end bevelled and a stub shaft on said bevelled end normal to the bevelled surface of said end of said main shaft, the axis of said stub shaft where it joins said surface being offset from the axis of said main shaft;
(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft said wobble plate having a plurality of annularly arranged openings therein for operable reception of said portions of respective piston rods, the frusto conical part of the piston rods exerting line contact pressure relative to the wobble plate;
(G) and means preventing rotation of said wobble plate.

8. In a pneumatic motor:
(A) a main shaft having one end bevelled and a stub shaft on said bevelled end normal to the bevelled surface of said end of said main shaft, the axis of said stub where it joins said surface being offset from the axis of said main shaft;
(B) means rotatably mounting said main motor shaft;
(C) a plurality of parallel cylinders arranged annularly about the axis of the main shaft;
(D) a resilient plastic piston in each cylinder;
(E) a piston rod secured to each piston and extending outwardly of the outer end thereof, each of said piston rods having a frusto conical part facing away from its piston, there being a portion of said rod extending axially from said frusto conical side;
(F) a wobble plate operably mounted on the stub shaft, said wobble plate having a plurality of annularly arranged openings therein for operable reception of said portions of respective piston rods, the frusto conical part of the piston rods exerting line contact pressure relative to the wobble plate;
(G) and means preventing rotation of said wobble plate.

9. In a pneumatic motor:
(A) a main shaft having one end bevelled and a stub shaft on said bevelled end normal to the bevelled surface of said end of said main shaft, the axis of said stub where it joins said surface being offset from the axis of said main shaft;
(B) means rotatably mounting said main motor shaft;
(C) a plurality of parallel cylinders arranged annularly about the axis of the main shaft;
(D) a "Teflon" piston in each cylinder;
(E) a piston rod secured to each piston and extending outwardly of the outer end thereof, each of said piston rods having a frusto conical part facing away from its piston, there being a portion of said rod extending axially from said frusto conical side;
(F) a wobble plate operably mounted on the stub shaft; said wobble plate having a plurality of annularly arranged openings therein for operable reception of said portions of respective piston rods, the frusto conical part of the piston rods exerting line contact pressure relative to the wobble plate;
(G) and means preventing rotation of said wobble plate.

10. In a pneumatic motor:
(A) a main shaft normal to the bevelled surface of the bevelled end of said main shaft, the axis of said stub shaft being inclined relative to the axis of said main shaft;
(B) means rotatably mounting said main motor shaft;
(C) a plurality of cylinders operably arranged about the axis of the main shaft;
(D) a piston in each cylinder;
(E) a piston rod for each piston;
(F) a wobble plate assembly operably mounted on the stub shaft, said wobble plate assembly including an inner bearing race secured on said stub shaft, an outer bearing race and two sets of balls between said inner and outer races, said sets of balls being in planes parallel to each other, and an annular flange on the outer race in a plane normal to the axis of the stub shaft, said flange comprising a wobble plate having a plurality of holes therethrough for operable reception of respective piston rods, each of said piston rods having a part for exerting operating pressure on said wobble plate;
(G) and means preventing rotation of said wobble plate.

11. In a pneumatic motor:
(a) a main shaft having one end bevelled and a stub shaft on said bevelled end normal to the bevelled surface of said end of said main shaft, the axis of said stub shaft where it joins said surface being offset from the axis of said main shaft;
(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft, said wobble plate having a plurality of annularly arranged openings therein for operable reception of said portions of respective piston rods, the frusto conical part of the piston rods exerting line contact pressure relative to the wobble plate;
(G) means preventing rotation of said wobble plate;
(H) and means for operably controlling pressure fluid to and from said pistons, including means for initially relieving pressure in cylinders wherein the pistons have reached the end of their power strokes and then connecting said cylinders with atmosphere while said pistons move to a position for beginning the next power stroke.

12. In a pneumatic motor:
(A) a main shaft having one end bevelled and a stub shaft on said bevelled end normal to the bevelled surface of said end of said main shaft, the axis of said stub shaft where it joins said surface being offset from the axis of said main shaft;
(B) means rotatably mounting said main motor shaft;
(C) a plurality of parallel cylinders arranged annularly about the axis of the main shaft;
(D) a piston in each cylinder;
(E) a piston rod secured to each piston and extending outwardly of the outer end thereof, each of said piston rods having a frusto conical part facing away from its piston, there being a portion of said rod extending from said frusto conical side;
(F) a wobble plate operably mounted on the stub shaft, said wobble plate having a plurality of annularly arranged openings therein for operable reception of said portions of respective piston rods, the frusto conical part of the piston rods exerting line contact pressure relative to the wobble plate;
(G) means preventing rotation of said wobble plate;
(H) and means for operably controlling pressure fluid to and from said pistons, said means including portions of said main shaft, including relieved portions of said main shaft at diametrically opposite sides thereof with a part of the shaft forming a partition between said recesses, one of said recesses being connected with a source of pressure fluid for successively supplying fluid to said cylinders with rotation of the motor shaft, there being pressure fluid supplied to a plurality of cylinders at a time, the other of said recesses being connected to atmosphere and being adapted to be connected with cylinders for exhausting fluid therefrom, said shaft having a groove in the partition between said recessses, said groove having a connection with atmosphere and adapted to be connected successively with said cylinders for relieving pressure therein when the pistons reach the end of their power strokes.

References Cited by the Examiner

UNITED STATES PATENTS

| | | | |
|---|---|---|---|
| 2,268,000 | 12/1941 | Treer | 91—175 |
| 2,625,914 | 1/1953 | Pressler | 91—175 |
| 2,678,536 | 5/1954 | Morgan | 91—175 |

FOREIGN PATENTS

| | | |
|---|---|---|
| 539,939 | 12/1931 | Germany. |
| 179,932 | 7/1962 | Sweden. |

MARTIN P. SCHWADRON, *Primary Examiner.*

SAMUEL LEVINE, *Examiner.*

P. E. MASLOUSKY, *Assistant Examiner.*